United States Patent
Nicholson

(10) Patent No.: US 12,287,517 B2
(45) Date of Patent: Apr. 29, 2025

(54) FIBRE OPTIC WET MATE CONNECTOR SYSTEM

(71) Applicant: OneSubsea IP UK Limited, London (GB)

(72) Inventor: Joseph Allan Nicholson, Barrow-in-Furness (GB)

(73) Assignee: ONESUBSEA IP UK LIMITED, London (GB)

( * ) Notice: Subject to any disclaimer, the term of this patent is extended or adjusted under 35 U.S.C. 154(b) by 0 days.

(21) Appl. No.: 18/549,927

(22) PCT Filed: Mar. 9, 2022

(86) PCT No.: PCT/US2022/019578
§ 371 (c)(1),
(2) Date: Sep. 11, 2023

(87) PCT Pub. No.: WO2022/192416
PCT Pub. Date: Sep. 15, 2022

(65) Prior Publication Data
US 2024/0151915 A1 May 9, 2024

Related U.S. Application Data

(60) Provisional application No. 63/158,385, filed on Mar. 9, 2021.

(51) Int. Cl.
*G02B 6/38* (2006.01)
(52) U.S. Cl.
CPC ......... *G02B 6/3874* (2013.01); *G02B 6/3816* (2013.01)

(58) Field of Classification Search
CPC .................. G02B 6/3874; G02B 6/3816
See application file for complete search history.

(56) References Cited

U.S. PATENT DOCUMENTS 5,838,857 A 11/1998 Niekrasz
6,315,461 B1 11/2001 Cairns
(Continued)

FOREIGN PATENT DOCUMENTS

WO 2020059205 A1 3/2020

OTHER PUBLICATIONS

Search Report and Written Opinion of International Patent Application No. PCT/US2022/019578 on Jun. 23, 2022; 7 pages.
(Continued)

*Primary Examiner* — Sung H Pak
*Assistant Examiner* — Hoang Q Tran
(74) *Attorney, Agent, or Firm* — Jeffrey D. Frantz

(57) ABSTRACT

An optical connection system includes a first connector having at least one first optical element and a first actuation arm rotatable about a first pivot point. The optical connection system also includes a second connector having at least one second optical element configured to be coupled to the at least one first optical element via an optical connection procedure. The second connector also includes a second actuation arm rotatable about a second pivot point. The first connector is configured to engage the second connector during the optical connection procedure such that the first actuation arm is rotated about the first pivot point, the second actuation arm is rotated about the second pivot point, and an interface between the first actuation arm and the second actuation arm moves away from a longitudinal axis of the optical connection system.

20 Claims, 11 Drawing Sheets

(56) References Cited

U.S. PATENT DOCUMENTS

| | | | |
|---|---|---|---|
| 7,004,638 B2 | 2/2006 | Nicholson | |
| 7,344,316 B2 * | 3/2008 | McKinnon | G02B 6/3816 385/59 |
| 7,618,198 B2 | 11/2009 | Baxter | |
| 2009/0080837 A1 * | 3/2009 | Baxter | G02B 6/3816 385/56 |
| 2011/0075972 A1 * | 3/2011 | Parkman, III | G02B 6/3871 29/825 |
| 2012/0294569 A1 | 11/2012 | Cairns | |
| 2016/0276775 A1 | 9/2016 | Nicholson | |
| 2017/0242210 A1 * | 8/2017 | Armistead | G02B 6/4427 |
| 2021/0341683 A1 | 11/2021 | Otomitsu | |

OTHER PUBLICATIONS

International Preliminary Report on Patentability of International Patent Application No. PCT/US2022/019578 on Sep. 21, 2023; 8 pages.

Extended Search Report issued in European Patent Application No. 22767910.7 dated Dec. 5, 2024, 8 pages.

* cited by examiner

FIBRE OPTIC WET MATE CONNECTOR SYSTEM

CROSS-REFERENCE TO RELATED APPLICATION

This application is a National Stage Entry of International Application No. PCT/US2022/019578, filed Mar. 9, 2022, which claims priority to and the benefit of U.S. Provisional Application No. 63/158,385, entitled "FIBRE OPTIC WET MATE CONNECTOR SYSTEM," filed Mar. 9, 2021, which is hereby incorporated by reference in its entirety for all purposes.

BACKGROUND

The present disclosure generally relates to systems and methods employing a sealing and connection assembly for connectors, such as optical fibre connectors, for use in harsh environments, such as subsea and oil well applications.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

In recent times, there has been an increasing need to provide complex machinery in subsea locations for use in oil and gas wellheads, as well as for other subsea applications. Accordingly, there is a need to provide adequate communication and control connections to such machinery, which has led to a desire to enable optical communications to be employed to improve, in particular, data communications with such machinery.

However, equipment associated with subsea and oil/gas well applications may experience extreme pressures and/or temperatures during continuous operation. Further, electrical and/or optical components must be protected from water damage. Further still, the environments in which such equipment is being operated are harsh in terms of levels of particulate contaminants and the potential for sea water or well fluid ingress.

Accordingly, it is exceptionally difficult to provide connections for optical fibre communications that are capable of withstanding the extreme pressures and/or temperatures involved in continuous operation, as well as providing a sufficient barrier to contamination from sand, silt, grit, and other contaminants. It is now recognized that it would be beneficial to improve the optical and mechanical performance of optical connectors.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, an optical connection system includes a first connector having at least one first optical element and a first actuation arm rotatable about a first pivot point. The optical connection system also includes a second connector having at least one second optical element configured to be coupled to the at least one first optical element via an optical connection procedure. The second connector also includes a second actuation arm rotatable about a second pivot point. The first connector is configured to engage the second connector during the optical connection procedure such that the first actuation arm is rotated about the first pivot point, the second actuation arm is rotated about the second pivot point, and an interface between the first actuation arm and the second actuation arm moves away from a longitudinal axis of the optical connection system.

In another embodiment, a method of connecting an optical connection system includes engaging a first connector having at least one first optical element with a second connector having at least one second optical element such that an interface is formed between a first actuation arm of the first connector and a second actuation arm of the second connector. The method also includes rotating the first actuation arm about a first pivot point and the second actuation arm about a second pivot point such that the interface moves away from a longitudinal axis extending through the optical connection system. The method also includes coupling the at least one first optical element and the at least one second optical element while the interface is a distance away from the longitudinal axis.

In another embodiment, an optical connection system includes a first connector having a first actuation arm rotatable about a first pivot point of the first connector, and having a first plurality of optical elements. The optical connection system also includes a second connector having a second actuation arm rotatable about a second pivot point of the second connector, and having a second plurality of optical elements. The optical connection system also includes at least one spring configured to exert, in response to engagement of the first connector with the second connector and to facilitate a coupling of the first plurality of optical elements with the second plurality of optical elements, at least one spring force that encourages the first actuation arm to rotate about the first pivot point, the second actuation arm to rotate about the second pivot point, and/or an interface between the first actuation arm and the second actuation arm to move away from a longitudinal axis of the optical connection system.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
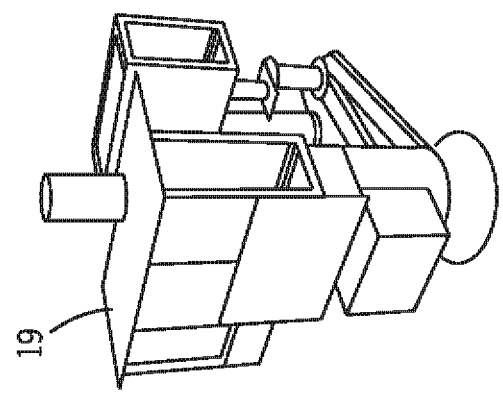
FIG. 1 is a schematic illustration of a subsea tree feed-through system employing an optical connection system having first and second connectors with rotatable actuation arms, according to an embodiment of the present disclosure.
Figure 1:
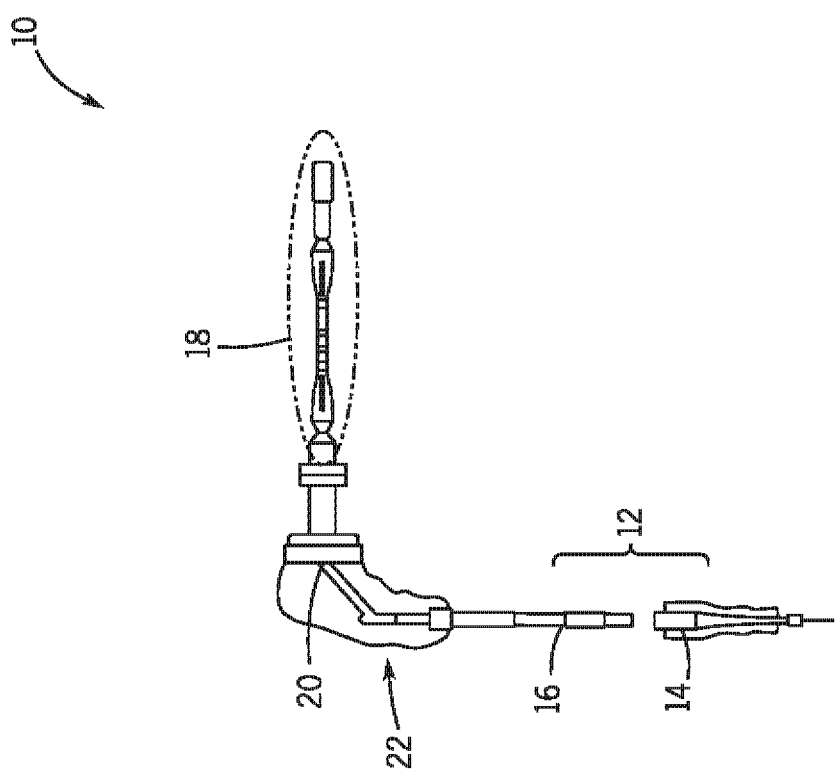

Certain embodiments commensurate in scope with the present disclosure are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

As used herein, the term "coupled" or "coupled to" may indicate establishing either a direct or indirect connection (e.g., where the connection may not include or include intermediate or intervening components between those coupled), and is not limited to either unless expressly referenced as such. The term "set" may refer to one or more items. Wherever possible, like or identical reference numerals are used in the figures to identify common or the same elements. The figures are not necessarily to scale and certain features and certain views of the figures may be shown exaggerated in scale for purposes of clarification.

Furthermore, when introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment," "an embodiment," or "some embodiments" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase A "or" B is intended to mean A, B, or both A and B.

Hydrocarbon fluids, such as oil and natural gas, may be obtained from subterranean or subsea geologic formations, often referred to as reservoirs, by drilling one or more wells that penetrate the hydrocarbon-bearing geologic formation. In subsea applications, various types of infrastructure may be positioned underwater and/or along a sea floor to aid in retrieving the hydrocarbon fluids. In both land-based and subsea applications, cables or tubes (e.g., electrical cables, fibre optic tubes, etc.) may be used to carry power, data signals, and/or control signals. Such cables or tubes may encounter extreme operating conditions such as low temperatures (e.g., less than 20 degrees, less than zero degrees, or less than −20 degrees Celsius), high temperatures (e.g., above 40 degrees, above 70 degrees, above 100 degrees, or above 130 degrees Celsius), temperature variations between low and high temperatures within a short time frame (e.g., seconds, minutes, or hours), high pressures, and/or corrosive environments (e.g., downhole or subsea having sand, silt, grit, and other contaminants).

In accordance with the present disclosure, optical fibre tubes are coupled via connectors employing a sealing and/or connection assembly, referred to in certain instances of the present disclosure as a shutter assembly. For example, a first optical fibre tube (or plurality of tubes) includes a first connector and a second optical fibre tube (or plurality of tubes) includes a second connector configured to engage the first connector. The first connector includes one or more optical elements (e.g., optical channels), a first actuation arm rotatable about a first pivot point at a first proximal end of the first actuation arm, and a male tip disposed at a first distal end of the first actuation arm opposing the first proximal end. The second connector includes one or more optical elements (e.g., optical channels), a second actuation arm rotatable about a second pivot point at a second proximal end of the second actuation arm, and a female tip disposed at a second distal end of the second actuation arm opposing the second proximal end. The female tip of the second connector includes a receptacle configured to receive the male tip of the first connector, such that the male tip and the female tip form an interface as the first connector and the second connector are engaged.

The female tip may be rotatable about a third pivot point between the second distal end of the second actuation arm and the female tip. The third pivot point between the second distal end of the second actuation arm and the female tip may be misaligned with respect to an axis extending through the second connector (or, during engagement, through both the first connector and the second connector). That is, the third pivot point may be radially offset from the axis. Misalignment of the third pivot point with respect to the axis may encourage the shutter assembly (e.g., the first actuation arm of the first connector and the second actuation arm of the second connector) to collapse radially outward from the axis in response to axial engagement of the first connector with the second connector. That is, as the first connector and the second connector are engaged and forced together in an axial direction, the shutter assembly may collapse outwardly from the axis, causing the first actuation arm of the first connector to rotate about the first pivot point at the first proximal end of the first actuation arm, the second actuation arm of the second connector to rotate about the second pivot point at the second proximal end of the second actuation arm, and the interface between the first actuation arm and the second actuation arm to move radially outward from the axis. The female tip may rotate about the third pivot point between the second distal end of the second actuation arm and the female tip as the shutter assembly collapses, thereby causing the female tip to maintain an engagement with the male tip of the first connector. As the interface defined by the male tip and the female tip of the shutter assembly moves away from the axis and the shutter assembly collapses, the one or more optical elements (e.g., optical channels) of the first connector and the one or more optical elements (e.g., optical channels) of the second connector are mated to form one or more optical paths that span the first connector and the second connector.

Presently disclosed embodiments may also employ one or more spring forces that encourage connection between the first connector and the second connector and encourage the above-described collapsing of the shutter assembly. For example, the first actuation arm of the first connector is configured to rotate about the above-described first pivot point, which may be disposed at a first actuation sleeve of the first connector adjacent to the first actuation arm. The first actuation sleeve may abut a first spring of the first connector, where the first spring is disposed in a first chamber of the first connector and the first actuation sleeve extends into the first chamber. As will be described in detail with reference to the drawings, the first connector may include an additional spring (e.g., having a larger diameter than the first spring) that abuts an end of a compensation module having the first chamber therein. In general, the compensation module may move in an axial direction against a spring force of the additional spring. The first spring may also exert a spring force against axial movement of the actuation sleeve relative to the compensation module.

The second actuation arm of the second connector is configured to rotate about the above-described second pivot point, which may be disposed at a second actuation sleeve of the second connector adjacent to the second actuation arm. The second actuation sleeve may abut a second spring of the second connector similar to the first spring of the first connector. Indeed, the second spring is disposed in a second chamber of the second connector, and the second actuation sleeve extends into the second chamber. The second spring may exert a second spring force against axial movement of the second actuation sleeve of the second connector.

In general, as the first connector and the second connector are engaged and forced together along an axial direction, the first spring of the first connector, the additional spring of the first connector, and/or the second spring of the second connector may be compressed in a manner that enables the shutter assembly to collapse and the optical elements (e.g., optical channels) of the first and second connectors to mate. Aspects of the first spring of the first connector, the additional spring of the first connector, and the second spring of the second connector will be described in detail with reference to the drawings. The above-described features may enable the shutter assembly to quickly collapse in response to axial engagement of the first connector and the second connector, thereby enabling a relatively fast connection that protects the optical elements from damage by water, contaminants, and/or other aspects of the relatively harsh subsea environment.

Other features in accordance with the present disclosure include cavities of the first and second connectors filled and sealed with a dielectric, optically matched fluid (e.g., oil) that protects the optical elements of the first and second connectors and/or enables efficient optical communication, and diaphragms employed in the first and second connectors to enable pressure balancing needed that facilitates efficient optical communication in the subsea environment. These and other features will be described in detail below with reference to the drawings. In general, the presently disclosed shutter assembly is employed to enable a quick connection between optical fibre connectors while reducing or negating a possibility of damage to the connectors that could otherwise be caused by harsh subsea environments.

With the foregoing in mind, FIG. 1 is a schematic illustration of an embodiment of a subsea tree feedthrough system 10 employing an optical connection system 12 having a first connector 14 and a second connector 16 with rotatable actuation arms. The first connector 14 and the second connector 16 may include one or more optical elements (e.g., optical channels) configured to enable optical transmission of data signals (e.g., communication signals, control signals, and the like). While presently disclosed embodiments in later figures include four optical channels in each of the first and second connectors 14, 16, other embodiments may include fewer than four optical channels or more than four optical channels. In certain instances of the present disclosure, the first connector 14 may be referred to as a receptacle connector and the second connector 16 may be referred to as a plug connector. For example, the first connector 14, or receptacle connector, may include an outer casing defining a receptacle that receives an outer casing of the second connector 16, or plug connector.

The subsea tree feedthrough system 10 also includes a wellhead outlet 18 (e.g., defining a pressure barrier) and a barrier flange 20 coupled to the wellhead outlet 18. The wellhead outlet 18 may be configured to couple to a control module 19, which may be coupled to a surface platform (not shown). The barrier flange 20 may be coupled to the second connector 16, or plug connector, via a segment 22 of optical channels and/or other structure. In general, the first connector 14 and the second connector 16 may be coupled together in subsea applications at underwater depths of up to 1000 to 3000 meters. Accordingly, the first connector 14 and the second connector 16, in addition to being exposed to water, may be exposed to harsh environments with extreme pressures, extreme temperatures, and/or contaminants (e.g., sand, silt, grit, and other contaminants).

For the above-described reasons, among others, the first connector 14 and the second connector 16 in accordance with the present disclosure include connection and sealing features that enable a coupling of the first connector 14 with the second connector 16 while negating or reducing a likelihood of damage or other negative effects associated with subsea environments. For example, the first connector 14 and the second connector 16 may employ a spring-loaded connection shutter system with rotatable actuation arms that quickly collapse in response to engagement of the first connector 14 and the second connector 16. Collapsing of the rotatable actuation arms enables a coupling of the optical channels in the first connector 14 and the optical channels in the second connector 16 to form optical paths spanning the first connector 14 and the second connector 16. Further, cavities of the first connector 14 and the second connector 16 may be filled and sealed with an optically matched optical or dielectric fluid, such as oil, that protects the optical channels from the relatively harsh subsea environment before, during, and after a coupling of the first connector 14 and the second connector 16. The first connector 14 and the second connector 16 may also include diaphragms ported to an external environment that enable a suitable pressure within the connectors 14, 16 for ensuring efficient optical communication via the optical channels and corresponding optical paths. These and other features will be described in detail below with reference to the drawings.

Figure 2:
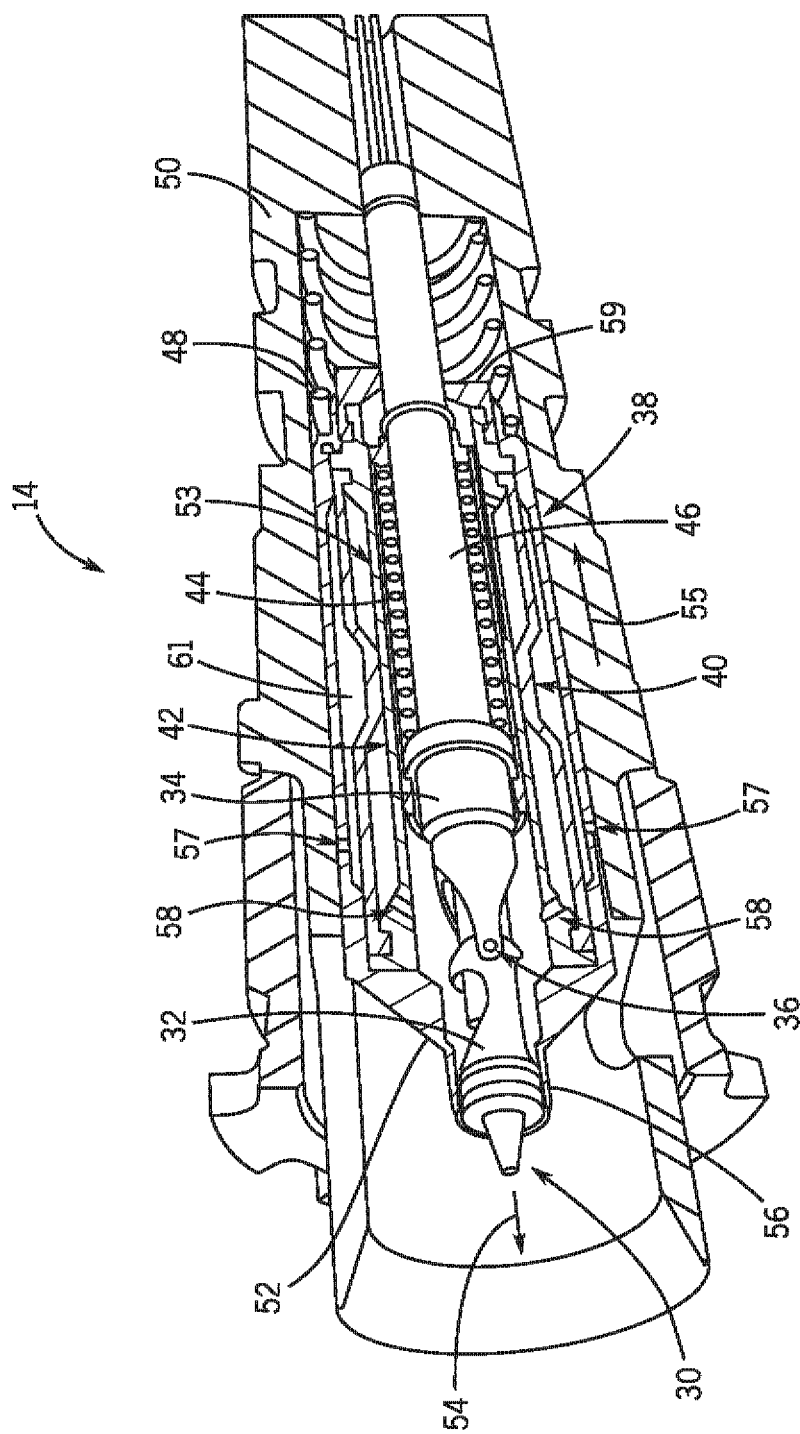
FIG. 2 is a cross-sectional perspective view of a first connector of the optical connection system employed in the subsea tree feedthrough system of FIG. 1, according to an embodiment of the present disclosure.

FIG. 2 is a cross-sectional perspective view of an embodiment of the first connector 14 of the optical connection system 12 employed in the subsea tree feedthrough 10 system of FIG. 1. The second connector 16 of the optical connection system 12 will be described with reference to later drawings. In the illustrated embodiment, the first connector 14, referred to in certain instances of the present disclosure as a receptacle connector, includes a male tip 30 coupled to (or integral with) a distal end of the first actuation arm 32, an actuation sleeve 34 forming a first pivot point 36 engaged by a proximal end of the first actuation arm 32, a compensation module 38, a diaphragm 40 in the compensation module 38, and a chamber 42 radially inward from the compensation module 38. A first spring 44 is disposed in the chamber 42, and the actuation sleeve 34 extends into the chamber 42 such that the first spring 44 abuts the actuation sleeve 34. The first connector 14 also includes a first wand 46 disposed radially inward from the first spring 44 and extending axially along the first connector 14, where optical elements (e.g., optical channels) are formed in the first wand 46. The first wand 46 and corresponding optical channels will be described in detail below with reference to FIGS. 3-5.

Continuing with the embodiment illustrated in FIG. 2, an additional spring 48 (e.g., having a greater diameter than the first spring 44) may be disposed at an end of the compensation module 38 and abuts the compensation module 38. The compensation module includes a tapered (or conical) surface 52 that, when abutted by a matching tapered surface of the second connector (not shown in FIG. 2), causes the compensation module to move in an axial direction 55. As the compensation module 38 moves in the axial direction 55 (e.g., relative to an outer casing 50 of the first connector 14, the additional spring 48 abutting the end of the compensation module 38 may be compressed and exert a spring force against the compensation module 38. Further, as the compensation module 38 moves (e.g., in the axial direction 55) relative to the outer casing 50, the male tip 30 of the first actuation arm 32 may tend to protrude (e.g., along an opposing axial direction 54) outwardly from the tapered surface 52. Thus, the actuation arm 32 and the male tip 30 may be freed from the compensation module 38, enabling the actuation arm 32 and the male tip 30 to rotate about the first pivot point 36 located at the actuation sleeve 34. As the male tip 30 engages features of the second connector and the shutter assembly collapses in accordance with the present disclosure, a spring force may be generated in the first spring 44 and the first spring 44 may continue to compress until the first connector 14 and the second connector are fully engaged and fixed.

Further, aspects of the first connector 14 may be employed to seal an optical or dielectric fluid radially inwards from the diaphragm 40. For example, the compensation module 38 includes a flange 56 extending from the tapered surface 52 of the compensation module 38. When the male tip 30 is in the illustrated position, the male tip 30 may seal the chamber 42 such that the optical or dielectric fluid cannot escape. A corresponding surface of the second connector (not shown in FIG. 2) may receive the flange 56 of the first connector 14 as the male tip 30 begins to protrude in the axial direction 54 away from the flange 56. Thus, the corresponding surface of the second connector and the flange 56 of the first connector 14 may maintain a sealed environment 53 in which the optical or dielectric fluid is disposed. In some embodiments, as the first connector 14 and the second connector are coupled as described above and in greater detail with reference to later figures, the optical or dielectric fluid may traverse between the sealed environments of the first connector 14 and the second connector (e.g., through the connection between the flange 56 of the first connector 14 and the corresponding surface of the second connector). Further, the diaphragm 40 of the first connector 14 may operate to maintain a suitable pressure in the first connector 14 to enable efficient optical communication. Indeed, ports 57 in the compensation module 38 may enable fluid (e.g., seawater) ingress/egress into a space 61 radially outward from the diaphragm 40, and ports 58 through the chamber 42 may enable fluid (e.g., optical or dielectric fluid) movement radially inward from the diaphragm 40 and within the sealed environment. As previously noted, the sealed environment is sealed at a front end of the compensation module 38 via the male tip 30. Further, the sealed environment is sealed at a back end of the compensation module 38 via a seal 59.

Figure 3:
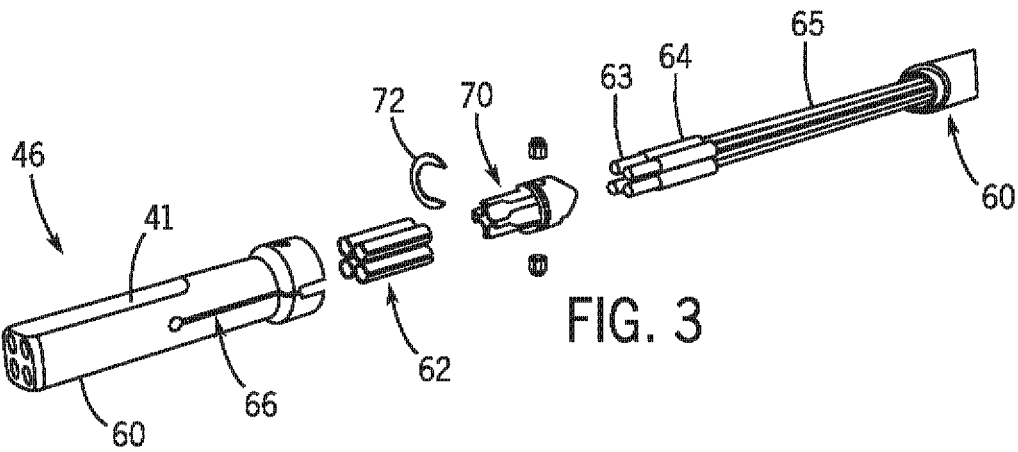
FIG. 3 is an exploded perspective view of a first wand employed in the first connector of FIG. 2 and having multiple optical elements, according to an embodiment of the present disclosure.
Figure 4:
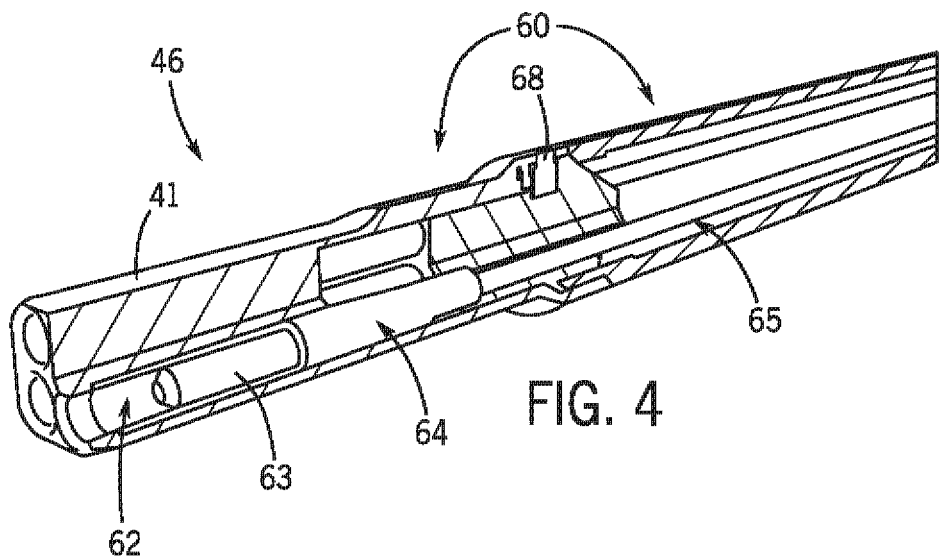
FIG. 4 is a cross-sectional perspective view of the first wand of FIG. 3, according to an embodiment of the present disclosure.
Figure 5:
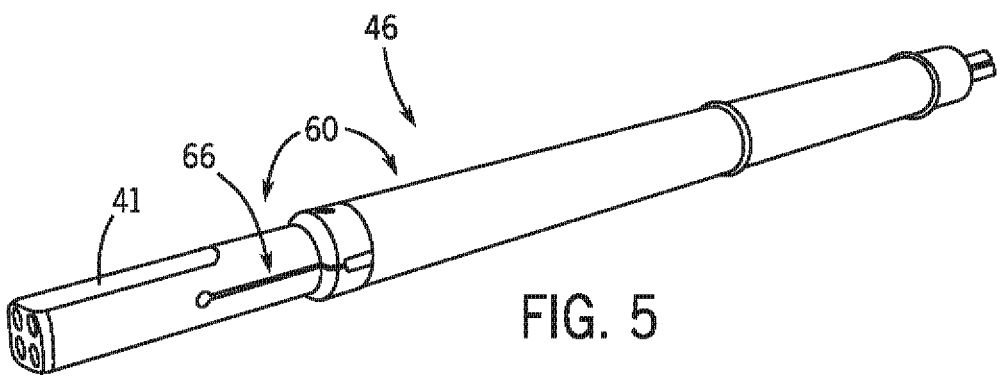
FIG. 5 is an external perspective view of the first wand of FIG. 3, according to an embodiment of the present disclosure.

FIG. 3 is an exploded perspective view of an embodiment of the first wand 46 employed in the first connector 14 of FIG. 2. Further, FIG. 4 is a cross-sectional perspective view of the first wand 46, and FIG. 5 is an external perspective view of the first wand 46. The first wand 46 may be referred to in certain instances of the present disclosure as a male wand. Indeed, the first wand 46 includes an outer casing 60 (e.g., including a four-way insert body 41) that is received by a receptacle of a second wand of a second connector (not shown in FIG. 3) to enable a coupling or mating of optical channels therebetween. While the first wand 46 is shown with a four-way insert body 41 in the present embodiment, in other embodiments, the insert body 41 may include a one-way insert body, two-way insert body, three-way insert body, or more.

As shown in FIGS. 3 and 4, the first wand 46 includes alignment sleeves 62 disposed in the four-way insert body 41, where the alignment sleeves 62 receive optical ferrules 63 of the first wand 46. Pressure bulkhead seals 64 illustrated in FIG. 4 are disposed adjacent the optical ferrules 63, and steel conduit tubes 65 encasing the optical fibre channels extend therefrom. As shown in FIGS. 3 and 5, the first wand 46 also includes insert body side slots 66 employed to locate a dowel pin 68 illustrated in FIG. 4, for purposes of radial movement and alignment of the ferrules 63 of the first wand 46 with mating ferrules of another wand. The first wand 46, as illustrated in FIG. 3, also includes a location spigot 70 and a circle clip 72 (e.g., configured to engage the location spigot 70), sometimes referred to as a circlip. As previously noted, the first wand 46 may be referred to as a male wand and may be configured to engage another wand (e.g., female wand) of a second connector. Engagement of the connectors during an optical connection procedure is illustrated in and will be described in further detail with reference to FIGS. 15-18.

Figure 6:
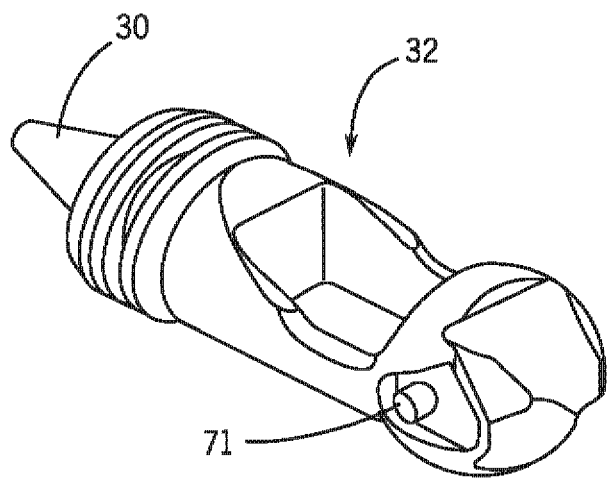
FIG. 6 is a perspective view of a first actuation arm including a male tip and first actuation arm employed in the first connector of FIG. 2, according to an embodiment of the present disclosure.
Figure 7:
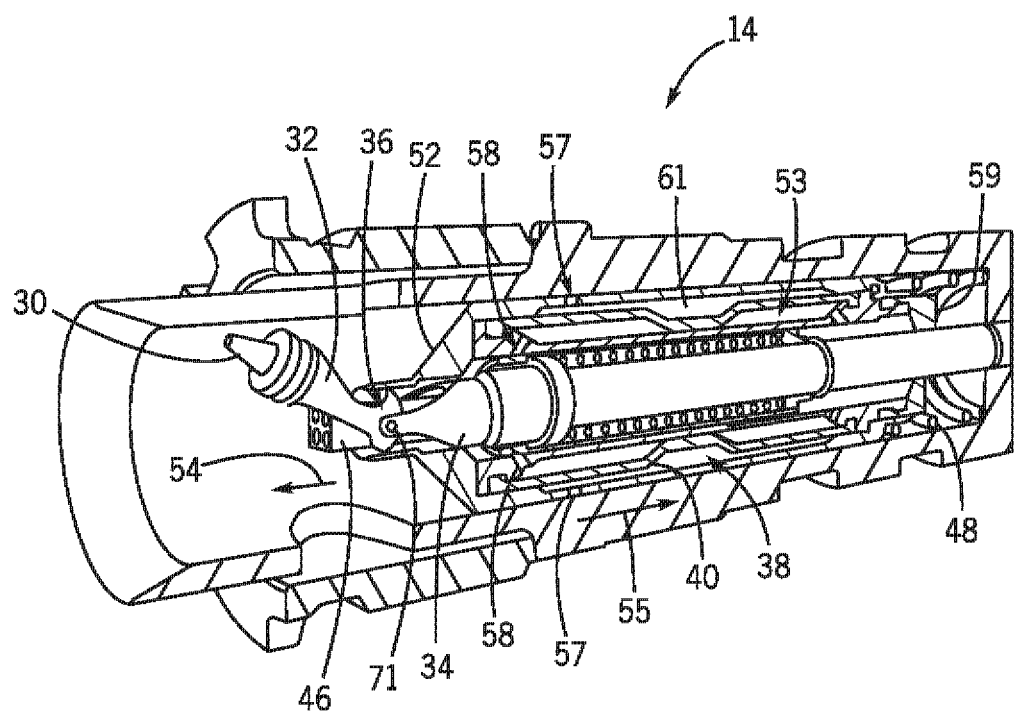
FIG. 7 is a cross-sectional perspective view of the first connector of FIG. 2 with a first actuation arm in a collapsed position, according to an embodiment of the present disclosure.

FIG. 6 is a perspective view of an embodiment of the first actuation arm 32, including the male tip 30, employed in the first connector 14 (e.g., receptacle connector) of FIG. 2. As shown, the male tip 30 may include a conical shape and may be integrated with the first actuation arm 32. In the illustrated embodiment, the first actuation arm 32 also includes pins 71 configured to engage the actuation sleeve 34 illustrated in FIG. 2 (and again in FIG. 7) and enable the first actuation arm 32 to rotate relative to the actuation sleeve. For example, FIG. 7 is a cross-sectional perspective view of an embodiment of the first connector 14 of FIG. 2 with the first actuation arm 32 in a collapsed position, after having rotated about the first pivot point 36 via the pins 71 of the first actuation arm 32 received by the actuation sleeve 34. As previously described, the compensation module 38 may be forced in the axial direction 55 (e.g., via engagement of another connector with the tapered surface 52 of the compensation module 38) and against a spring force of the additional spring 48 abutting the end of the compensation module 38, causing the first actuation arm 32 (and corresponding male tip 30) to protrude in the opposing axial direction 54 outwardly from the tapered surface 52 of the compensation module 38. With sufficient clearance from the tapered surface 52, the first actuation arm 32 having the male tip 30 can rotate about the pivot point 36 between the pins 71 of the first actuation arm 32 and the actuation sleeve 34, as shown. As previously described, a coupling of the first connector 14 with the second connector 16 will be described in detail below with reference to FIGS. 15-18.

Figure 8:
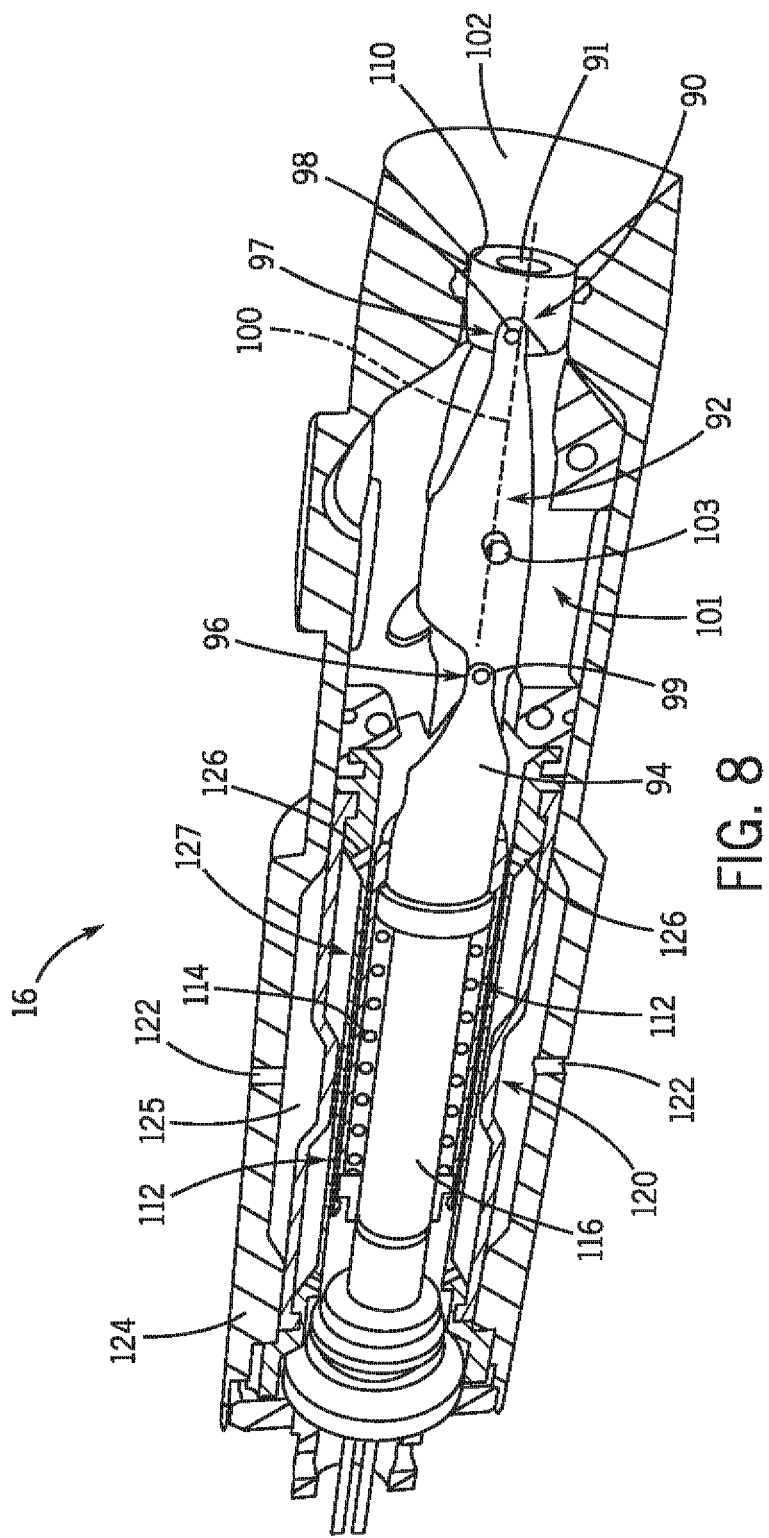
FIG. 8 is a cross-sectional perspective view of a second connector of the optical connection system employed in the subsea tree feedthrough system of FIG. 1, according to an embodiment of the present disclosure.

FIG. 8 is a cross-sectional perspective view of an embodiment of the second connector 16 of the optical connection system 12 employed in the subsea tree feedthrough system 10 of FIG. 1. In the illustrated embodiment, the second connector 16 includes a female tip 90 defining a receptacle 91 (e.g., configured to receive the male tip 30 illustrated in FIGS. 2, 6, and 7), a second actuation arm 92 coupled to the female tip 90, and a second actuation sleeve 94 coupled to the second actuation arm 92. A proximal end of the second actuation arm 92 is coupled to the second actuation sleeve 94 at a second pivot point 96 (e.g., via a pin 99). A distal end of the second actuation arm 92 is coupled to the female tip 90 at a third pivot point 97 (e.g., via a pin 98, which is disposed on the female tip 90 or the second actuation arm 92). Accordingly, the second actuation arm 92 can rotate about the second pivot point 96 relative to the actuation sleeve 94, and the female tip 90 can rotate about the third pivot point 97 relative to the second actuation arm 92.

As shown, the second connector 16 defines an axis 100 generally extending through an axial center of the second connector 16, and/or an axial center of the actuation assembly. The pin 98, which may be disposed on the second actuation arm 92 or on the female tip 90 adjacent the distal end of the second actuation arm 92, is misaligned with (e.g., radially offset from) the axis 100. As will be appreciated in view of later drawings and description, radially offsetting the pin 98 from the axis 100 encourages the female tip 90 to rotate about the third pivot point 97 and/or the second actuation arm 92 to rotate about the second pivot point 96, thereby enabling the shutter assembly to quickly collapse in response to engagement of the second connector 16 with the first connector 14 illustrated in FIGS. 2 and 7. The second connector 16 in the illustrated embodiment also includes a cam plate 101 defining a slot (not shown) that receives a knob 103 formed in the second actuation arm 92, where the knob 103 may be guided by the slot as the second actuation arm 92 rotates about the second pivot point 96 relative to the second actuation sleeve 94. The second connector 16 also includes a tapered (or conical) surface 102 corresponding to the tapered surface 52 of compensation module 38 of the first connector 14 illustrated in FIGS. 2 and 7. That is, the tapered surface 102 of the second connector 16 is configured to contact, with reference to FIGS. 2 and 7, the tapered surface 52 of the compensation module 38 of the first connector 14, thereby causing the compensation module 38 to move in the axial direction 55 such that the flange 56 connected to the tapered surface 52 of the compensation module 38 is received by an opening 110 defined by the tapered surface 102 in the second connector 16 of FIG. 8.

Similar to the first connector 14 illustrated in FIGS. 2 and 7, the second connector 16 illustrated in FIG. 8 includes a second chamber 112, a second spring 114 disposed in the second chamber 112, and a second wand 116 disposed radially inward from the second spring 114. A spring force in the second spring 114 may act against a force exerted through the actuation assembly, similar to the spring force in the first spring 44 of the first connector 14 illustrated in FIGS. 2 and 7 and described above. The second connector 16 in FIG. 8 also includes a second diaphragm 120 similar to the diaphragm 40 illustrated in the first connector 14 of FIGS. 2 and 7 and described in detail above. For example, ports 122 through a casing 124 of the second connector 16 may enable fluid (e.g., seawater) ingress/egress into a space 125 radially outward from the diaphragm 120, and ports 126 may enable fluid (e.g., optical or dielectric fluid) movement within a sealed environment 127 radially inward from the diaphragm 120. The sealed environment may be sealed at a front end of the second connector 16 via the female tip 90, where the seal is maintained during engagement of the first connector 14 (e.g., in FIGS. 2 and 7) with the second connector 16 as described in detail with reference to FIGS. 15-18.

Figure 9:
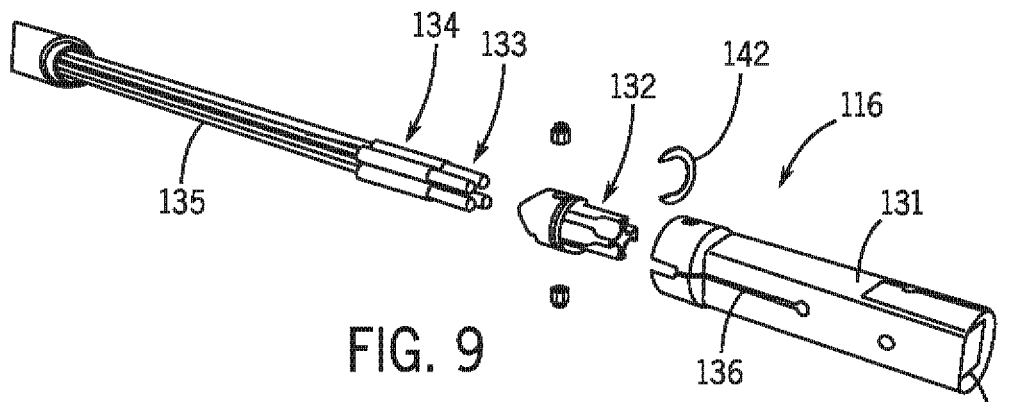
FIG. 9 is an exploded perspective view of a second wand employed in the second connector of FIG. 8, according to an embodiment of the present disclosure.
Figure 10:
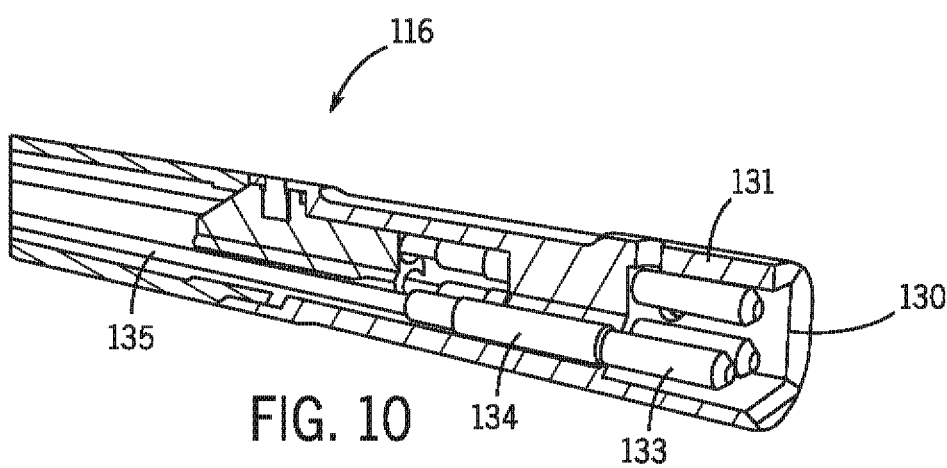
FIG. 10 is a cross-sectional perspective view of the second wand of FIG. 9, according to an embodiment of the present disclosure.
Figure 11:
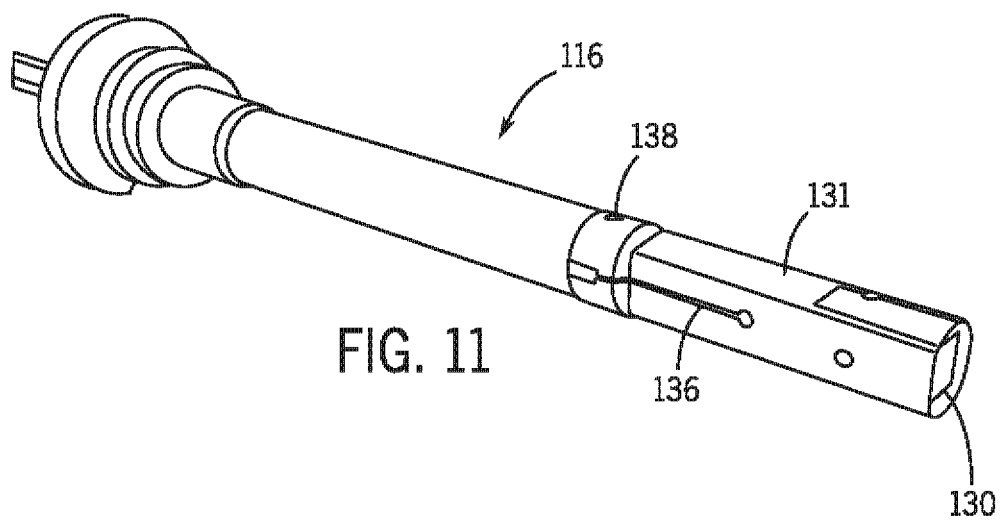
FIG. 11 is an external perspective view of the second wand of FIG. 9, according to an embodiment of the present disclosure.

FIG. 9 is an exploded perspective view of an embodiment of the second wand 116 employed in the second connector 16 of FIG. 8. Further, FIG. 10 is a cross-sectional perspective view of the second wand 116, and FIG. 11 is an external perspective view of an embodiment of the second wand 116. The second wand 116 may be referred to in certain instances of the present disclosure as a female wand. Indeed, the second wand 116 includes a receptacle 130 configured to receive the four-way insert body 41 of the outer casing 60 of the first wand 46 illustrated in FIGS. 3-5. As shown in FIGS. 9-11, the second wand 116 includes a female insert body 131. As shown in FIGS. 9 and 10, the female insert body 131 is configured to receive an alignment spigot 132 and optical ferrules 133. As shown in FIG. 10, the female insert body 131 is also configured to receive pressure bulkhead seals adjacent the optical ferrules 133. Steel conduit tubes 135 illustrated in FIGS. 9 and 10 are disposed adjacent the optical ferrules 133, and steel conduit tubes 135 encasing the optical fibre channels extend therefrom. Further, as shown in FIGS. 9 and 11, the second wand 116 includes insert body side slots 136 employed to locate a dowel pin 138, for purposes of radial movement and alignment of the ferrules 133 of the second wand 116 with those of the first wand. The second wand 116, as illustrated in FIG. 9, also includes a circle clip 142. As previously noted, the second wand 116 may be referred to as a female wand. Engagement of the connectors during an optical connection procedure is illustrated in, and will be described in detail with respect to, FIGS. 15-18.

Figure 12:
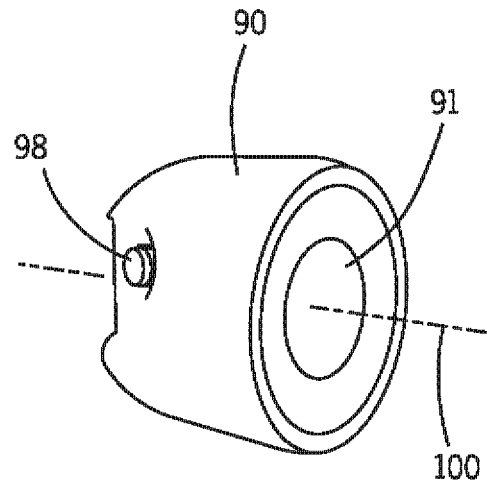
FIG. 12 is an external perspective view of a female tip employed in the second connector of FIG. 8 and configured to be coupled to a second actuation arm of the second connector of FIG. 8, according to an embodiment of the present disclosure.
Figure 13:
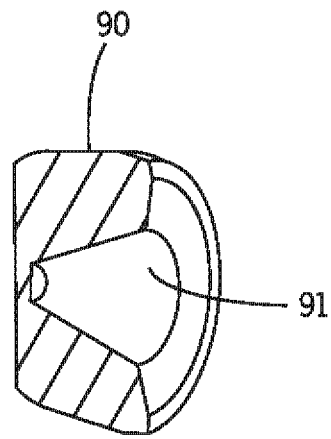
FIG. 13 is a cross-sectional perspective view of the female tip of FIG. 12, according to an embodiment of the present disclosure.

FIG. 12 is an external perspective view of an embodiment of the female tip 90 employed in the second connector 16 of FIG. 8 and configured to be coupled to a second actuation arm 92 of the second connector 16 of FIG. 8. FIG. 13 is a cross-sectional perspective view of the female tip 90. As illustrated in FIG. 12 and previously described, the pin 98 in the female tip 90 is offset from the axis 100 in a radial direction. Further, the pin 98 enables the female tip 90 to rotate relative to the section actuation arm 92 of the second connector 16 in FIG. 9, while maintaining engagement with the male tip 30 of the first connector 14 in FIGS. 2 and 7.

Figure 14:
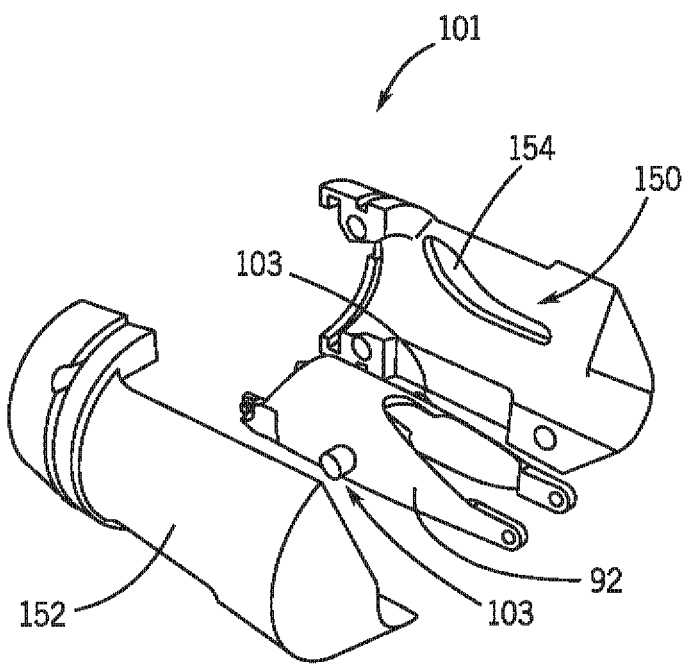
FIG. 14 is an exploded perspective view of a cam plate and a second actuation arm employed in the second connector of FIG. 8, according to an embodiment of the present disclosure.

FIG. 14 is an exploded perspective view of an embodiment of the cam plate 101 and the second actuation arm 92 employed in the second connector 16 of FIG. 8. As shown, the cam plate 101 may include a first cam plate segment 150 and a second cam plate segment 152. In the illustrated embodiment, the second actuation arm 92 includes two knobs 103 on opposing sides thereof. The knobs 103 may be configured to engage slots 154 in the first cam plate segment 150 and the second cam plate segment 152. The slots 154 are generally positioned and/or oriented to mimic rotation of the second actuation arm 92 as previously described. That is, engagement of the slots 154 with the knobs 103 may guide the second actuation arm 92 as it rotates in accordance with previous description.

Figure 15:
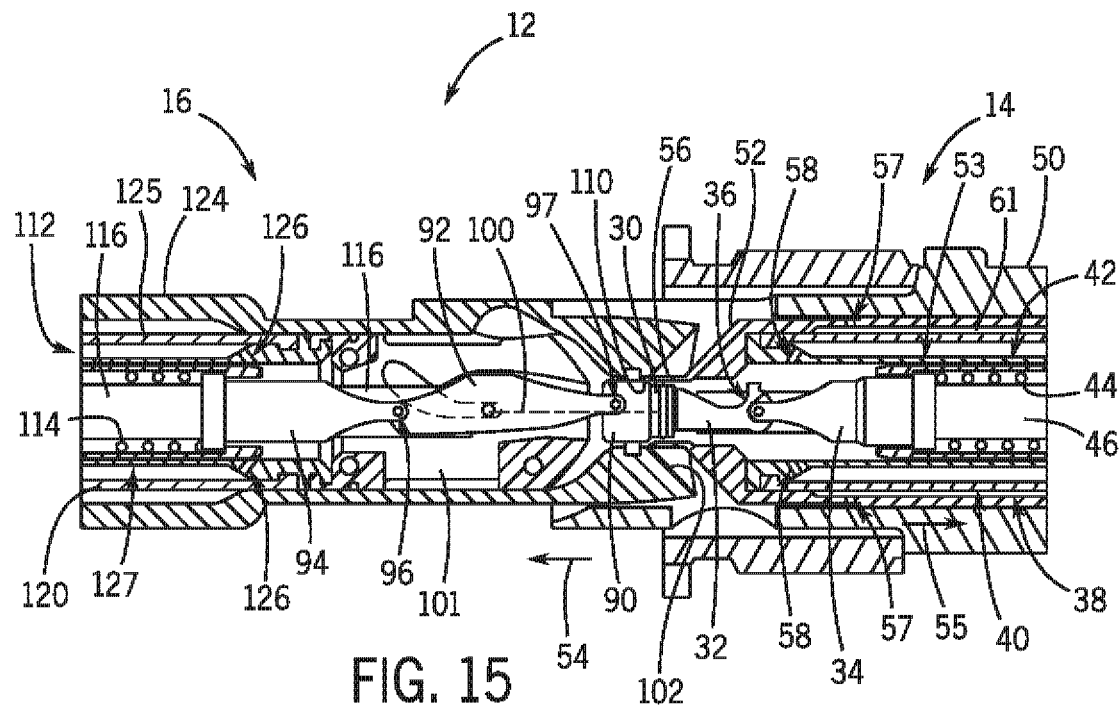
FIG. 15 is a cross-sectional side view of the optical connection system employed in the subsea tree feedthrough system of FIG. 1, where the optical connection system includes the first connector of FIG. 2 and the second connector of FIG. 8 in a first state of an optical connection procedure, according to an embodiment of the present disclosure.
Figure 16:
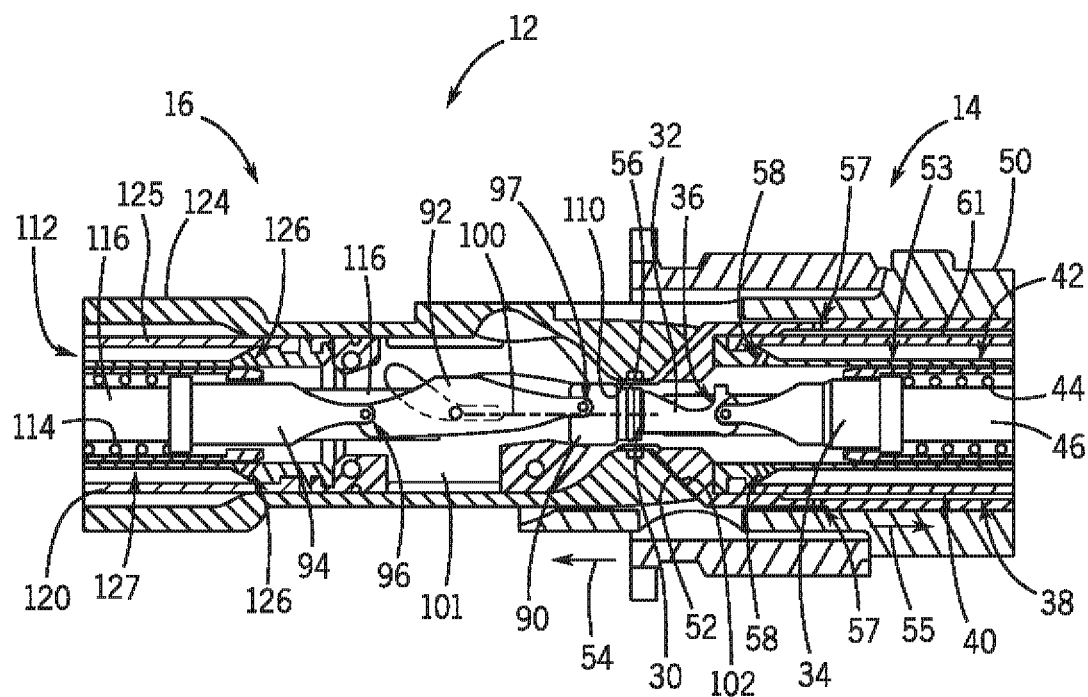
FIG. 16 is a cross-sectional side view of the optical connection system of FIG. 15, where the optical connection system includes the first connector of FIG. 2 and the second connector of FIG. 8 in a second state of an optical connection procedure, according to an embodiment of the present disclosure.
Figure 17:
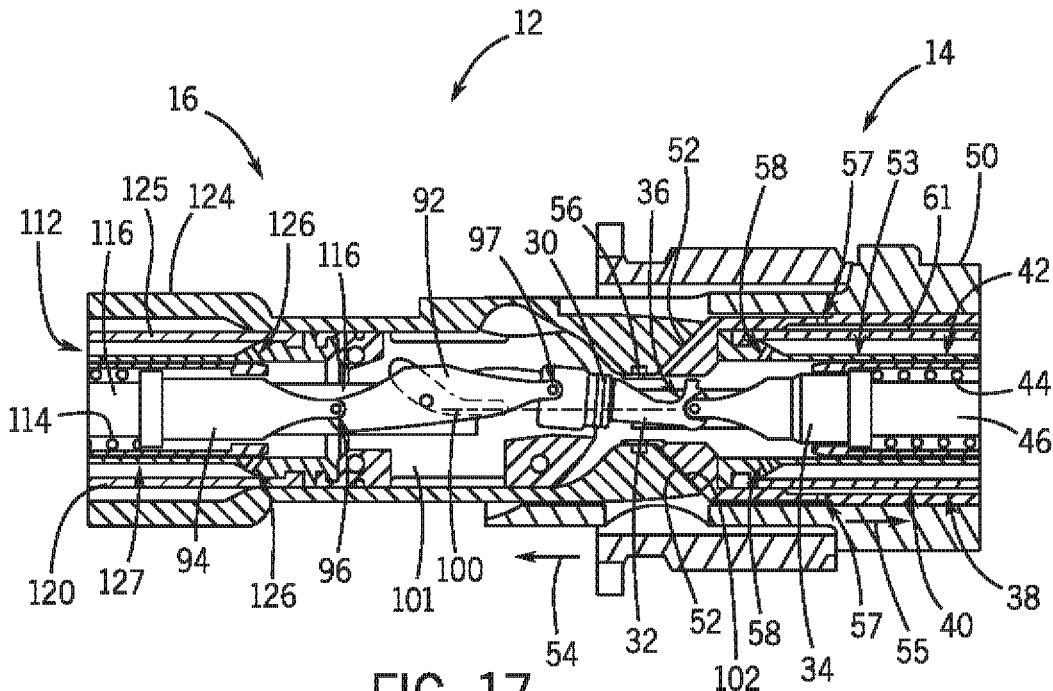
FIG. 17 is a cross-sectional side view of the optical connection system of FIG. 15, where the optical connection system includes the first connector of FIG. 2 and the second connector of FIG. 8 in a third state of an optical connection procedure, according to an embodiment of the present disclosure.
Figure 18:
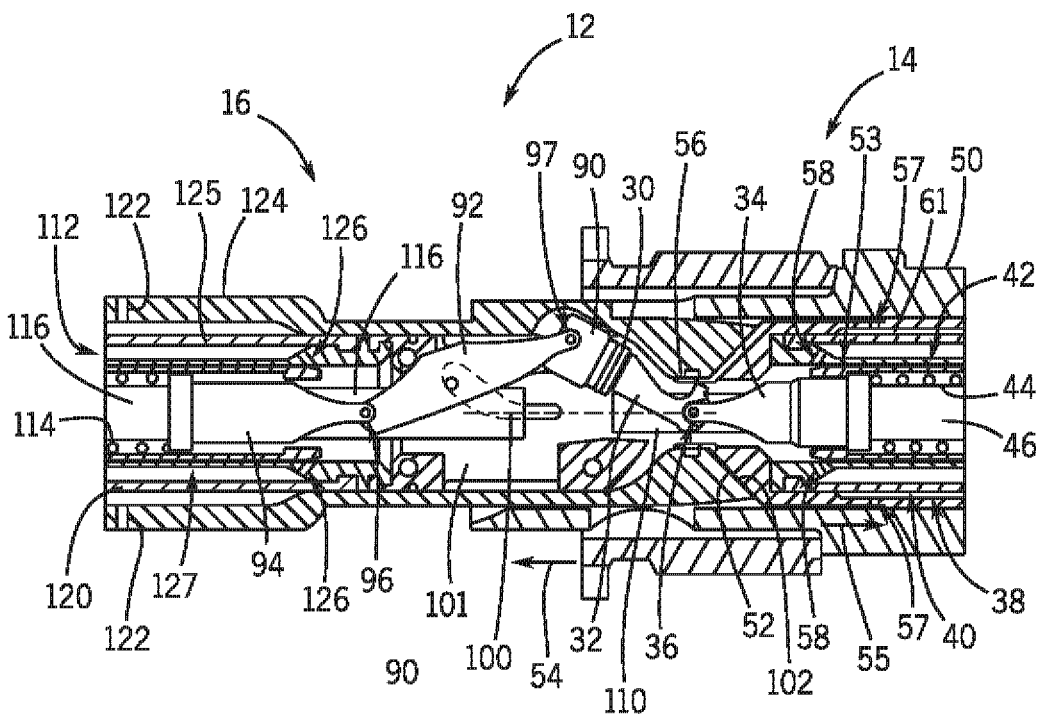
FIG. 18 is a cross-sectional side view of the optical connection system of FIG. 15, where the optical connection system includes the first connector of FIG. 2 and the second connector of FIG. 8 in a fourth state of an optical connection procedure, according to an embodiment of the present disclosure.

Various aspects of an optical connection system 12 are illustrated in FIGS. 1-14. FIGS. 15-18 illustrate a progression of an optical connection procedure employing the optical connection system 12. For example, FIG. 15 is a cross-sectional side view of the optical connection system 12 in a first state, FIG. 16 is a cross-sectional side view of the optical connection system 12 in a second state after the first state, FIG. 17 is a cross-sectional side view of the optical connection system 12 in a third state after the second state, and FIG. 18 is a cross-sectional view of the optical connection system 12 in a fourth state after the third state. In general, FIGS. 15-18 illustrate a progression of engaging the first connector 14 and the second connector 16 such that the shutter assembly (e.g., including an interface between the first actuation arm 32 of the first connector 14 and the second actuation arm 92 of the second connector 16) collapses outwardly from the axis 100 extending through the system 12 in response to the engagement.

For example, beginning with FIG. 15, the outer casing 50 of the first connector 14, or receptacle connector, receives the second connector 16, or plug connector. In FIG. 15, the male tip 30 of the first connector 14 is received by the female tip 90 of the second connector 16. In FIG. 15, the tapered surface 52 of the first connector 14 has not yet contacted the corresponding tapered surface 102 of the second connector 16. However, the flange 56 of the first connector 14, extending from the tapered surface 52 of the first connector 14, is beginning to be received by the opening 110 defined in the corresponding tapered surface 102 of the second connector 16.

In FIG. 16, the tapered surface 52 of the first connector 14 contacts the corresponding tapered surface 102 of the second connector 16, and the flange 56 extending from the tapered surface 52 of the first connector 14 is received by the opening 110 defined in the corresponding tapered surface 102 of the second connector 16. As the tapered surfaces 52, 102 collide, the compensation module 38 begins to move (e.g., relative to the outer casing 50) in the axial direction 55. Indeed, as illustrated in FIG. 17, the compensation module 38 has moved (e.g., relative to the outer casing 50) in the axial direction 55 such that the male tip 30 and the first actuation arm 32 of the first connector 14 protrude in the axial direction 54 from the flange 56 extending from the tapered surface 52 of the first connector 14. Further, the shutter assembly (e.g., including interface between the male tip 30 of the first connector 14 and the female tip 90 of the second connector 16) begins to become unstable and collapse radially outwardly from the axis 100. As illustrated in FIG. 18, the compensation module 38 continues to move (e.g., relative to the outer casing 50) to facilitate further protrusion of the male tip 30 and the first actuation arm 32 from the flange 56, thereby enabling the interface between the male tip 30 and the female tip 90 to move further apart from the axis 100 in the radial direction. Because of the above-described movement and actuation, the first wand 46 of the first connector 14 and the second wand 116 of the second connector 16 begin to come in close proximity with each other, as shown in FIG. 18. Further, movement of the interface between the male tip 30 and the female tip 90 away from the axis 100 exposes ends of the first and second wands 46, 116 for coupling. Indeed, FIG. 18 illustrates the interface in the furthest position from the axis 100. However, the first and second connectors 14, 16 may continue to be axially pressed together such that the wands 46, 116 are pressed together (e.g., such that the female wand 116 receives the male wand 46 in a receptacle and the optical ferrules of each are mated).

Figure 19:
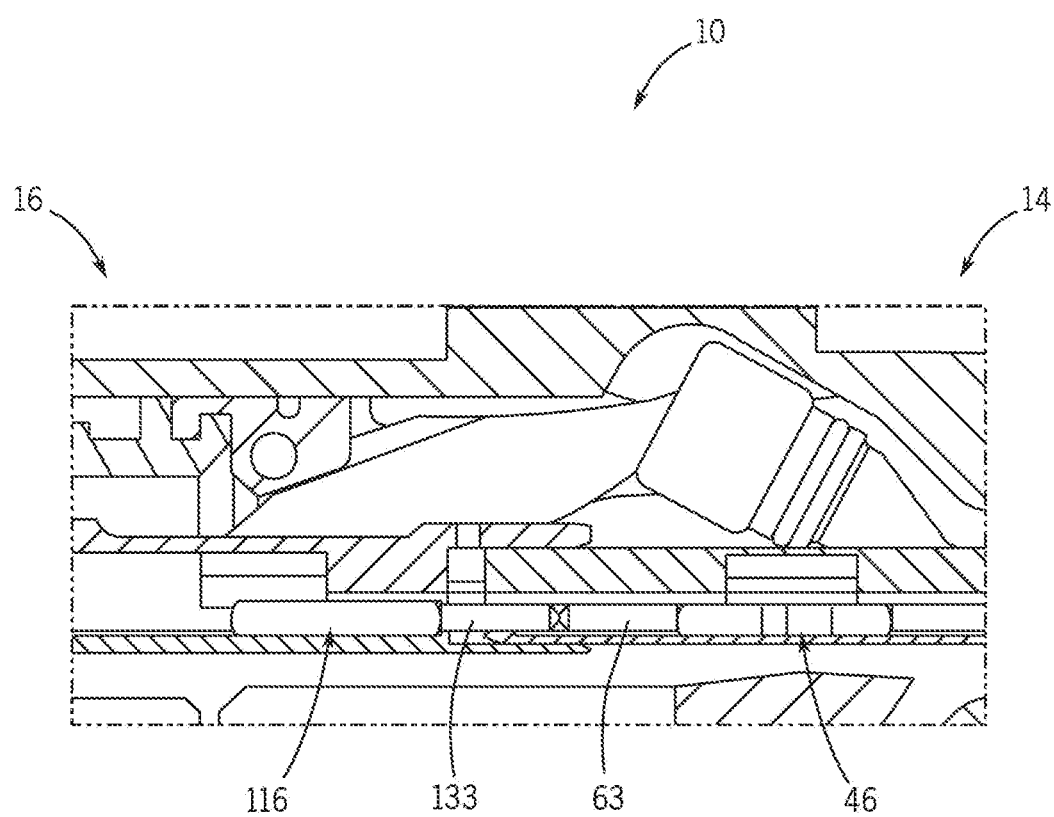
FIG. 19 is a cross-sectional view of the optical connection assembly of FIG. 1 including the first connector and the second connector coupled together such optical paths are formed through the first connector and the second connector, according to an embodiment of the present disclosure.

The spring pressure generated by the various springs 44, 48, 114 causes the optical ferrules of the wands 46, 116 to be pressed together to form optical paths spanning the first and second connectors 14, 16. For example, FIG. 19 is a cross-sectional view of the optical connection system 12 of FIG. 1 including the first connector 14 and the second connector 16 coupled together such that optical paths are formed through the first connector 14 and the second connector 16. That is, the first connector 14 and the second connector 16 are coupled such that the optical ferrules 63 of the first wand 46 of the first connector 14 are pressed against the optical ferrules 133 of the second wand 116 of the second connector 16. As previously described, the spring forces associated with the optical connection system 12 press the optical ferrules 63, 133 together such that optical paths are formed and span both the first connector 14 and the second connector 16. Further, it should be noted a weight of the tool or line enables engagement between the first connector 14 and the second connector 16 to be maintained.

Figure 20:
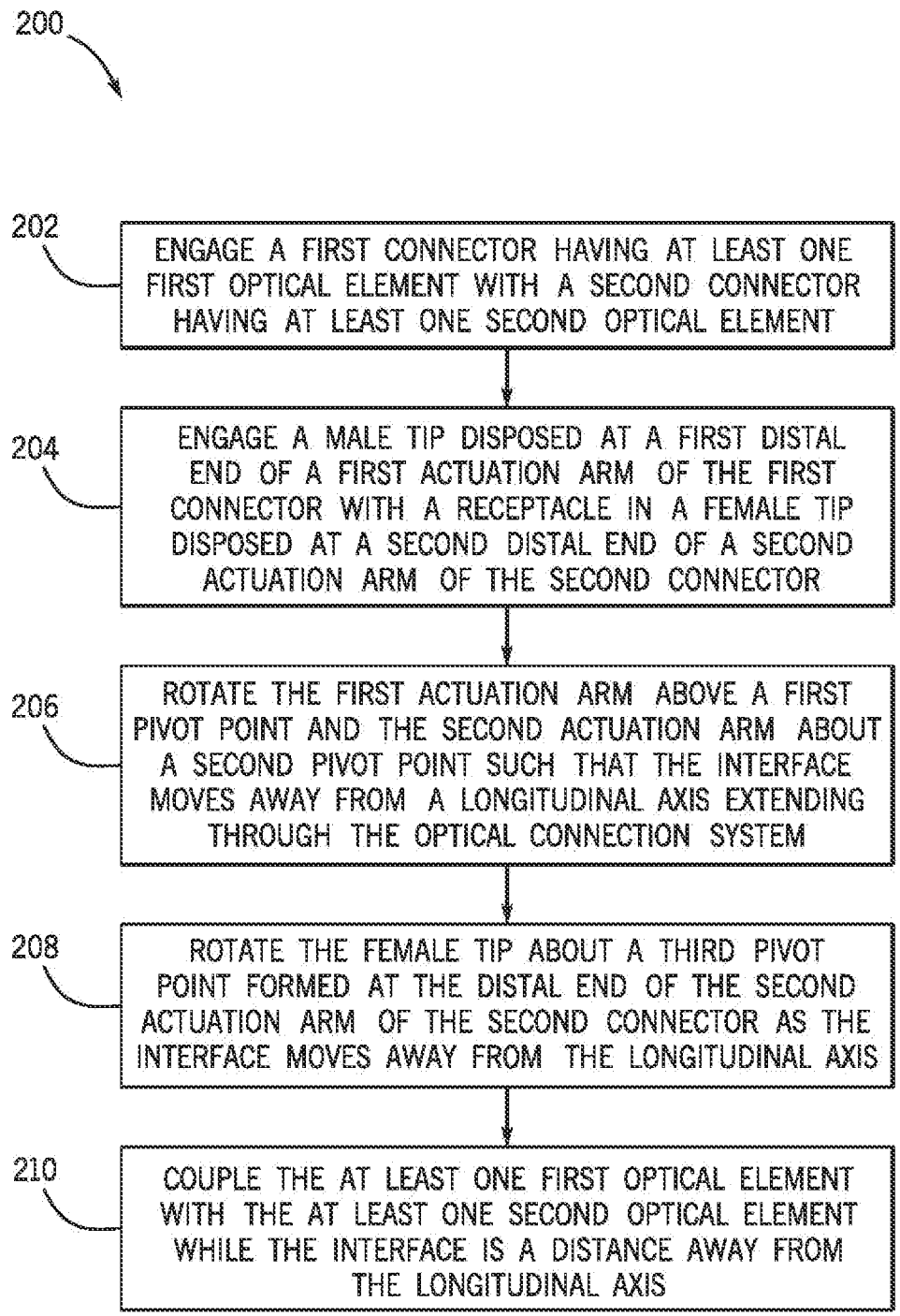
FIG. 20 is a process flow diagram illustrating a method of employing the optical connection system of FIG. 1 to connect the first connector of FIG. 2 and the second connector of FIG. 8 in an optical connection procedure, according to an embodiment of the present disclosure.

FIG. 20 is a process flow diagram illustrating an embodiment of a method 200 of employing the optical connection system illustrated in FIGS. 15-19 to connect the first connector of FIG. 2 and the second connector of FIG. 8. In the illustrated embodiment, the method 200 includes engaging (block 202) a first connector having at least one first optical element (e.g., optical channel or ferrule) with a second connector having at least one second optical element (e.g., optical channel or ferrule). The method 200 also includes engaging (block 204) a male tip at a first distal end of a first actuation arm of the first connector with a receptacle in a female tip disposed at a second distal end of a second actuation arm of the second connector. As previously described, the male tip and the female tip may be engaged prior to the second connector engaging the compensation module of the first connector. The compensation module may move in an axial direction, thereby enabling the male tip to protrude in an opposing axial direction from a surface (e.g., tapered surface) of the compensation module. As the male tip and the corresponding first actuation arm protrude at sufficient clearance from the compensation module, the shutter assembly (e.g., including the first actuation arm, the male tip, the second actuation arm, and the female tip) may begin to collapse away from a longitudinal axis.

Indeed, the method 200 also includes rotating (block 206) the first actuation arm about a first pivot point and the second actuation arm about a second pivot point such that the interface formed by the male tip and the female tip moves away from a longitudinal axis extending through the optical connection system. As previously described, the first pivot point may be located at a first actuation sleeve and the second pivot point may be located at a second actuation sleeve. An interface between the male tip and the female tip may be maintained as the first actuation arm and the second actuation arm rotate about the pivot points, relative to the actuation sleeves, such that the interface moves away from the longitudinal axis. Further, the method 200 includes rotating (block 208) the female tip about a third pivot point formed at the distal end of the second actuation arm of the second connector as the interface moves away from the longitudinal axis. In doing so, the interface between the male tip and the female tip is maintained during rotation of the actuation arms and as the interface moves away from the longitudinal axis. Finally, the method 200 includes coupling (block 210) the at least one first optical element (e.g., ferrule) with the at least one second optical element (e.g., ferrule) while the interface is a distance away from the longitudinal axis. As previously described, spring pressure generated by various spring forces may press the at least one first optical element of the first connector and the at least one second optical element of the second connector together.

The technical effects of the systems and methods described in the embodiments of FIGS. 1-20 include improved fibre optic communication in subsea environments and improved protection of optical components in subsea environments.

As used herein, the terms "inner" and "outer"; "up" and "down"; "upper" and "lower"; "upward" and "downward"; "above" and "below"; "inward" and "outward"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. Moreover, the order in which the elements of the methods described herein are illustrated and described may be rearranged, and/or two or more elements may occur simultaneously. The embodiments were chosen and described to best explain the principals of the disclosure and its practical applications, to thereby enable others skilled in the art to best utilize the disclosure and various embodiments with various modifications as are suited to the particular use contemplated.

Finally, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. § 112(f). However, for any claims containing elements designated in any other manner, it is intended that such elements are not to be interpreted under 35 U.S.C. § 112(f).

What is claimed is:

1. An optical connection system, comprising:
   a first connector comprising at least one first optical element and a first actuation arm rotatable about a first pivot point; and
   a second connector comprising:
      at least one second optical element configured to be coupled to the at least one first optical element via an optical connection procedure; and
      a second actuation arm rotatable about a second pivot point, wherein the first connector is configured to engage the second connector during the optical connection procedure such that the first actuation arm is rotated about the first pivot point, the second actuation arm is rotated about the second pivot point, and an interface between the first actuation arm and the second actuation arm moves away from a longitudinal axis of the optical connection system;
   wherein the first connector comprises a male tip coupled to a distal end of the first actuation arm.

2. The optical connection system of claim 1, wherein:
   the second connector comprises a female tip forming a receptacle configured to receive the male tip such that the male tip and the female tip form the interface between the first actuation arm and the second actuation arm.

3. The optical connection system of claim 2, wherein the female tip of the second connector is coupled to the second actuation arm via a third pivot point such that the female tip is configured to rotate about the third pivot point and maintain engagement with the male tip of the first connector during the optical connection procedure.

4. The optical connection system of claim 3, wherein the third pivot point between the female tip and the second actuation arm is offset from the longitudinal axis before, during, and after the optical connection procedure.

5. The optical connection system of claim 1, comprising:
a compensation module of the first connector; and
a spring abutting the compensation module, wherein the compensation module is configured to move in an axial direction against a spring force of the spring and in response to the second connector engaging the compensation module.

6. The optical connection system of claim 1, wherein:
the first connector comprises a first actuation sleeve and the first pivot point is disposed at the first actuation sleeve;
the first connector comprises a first spring abutting the first actuation sleeve such that the first actuation sleeve is positioned between the first spring and the first actuation arm;
the second connector comprises a second actuation sleeve and the second pivot point is disposed at the second actuation sleeve; and
the second connector comprises a second spring abutting the second actuation sleeve such that the second actuation sleeve is positioned between the second spring and the second actuation arm.

7. The optical connection system of claim 6, wherein:
the first connector comprises a first chamber in which the first spring is disposed and the first actuation sleeve extends, such that the first spring is configured to be compressed within the first chamber in response to the optical connection procedure, and the first actuation sleeve is configured to be retracted into the first chamber in response to the optical connection procedure; and
the second connector comprises a second chamber in which the second spring is disposed and the second actuation sleeve extends, such that the second spring is configured to be compressed within the second chamber in response to the optical connection procedure, and the second actuation sleeve is configured to be retracted into the second chamber in response to the optical connection procedure.

8. The optical connection system of claim 1, wherein:
the second connector comprises a cam plate defining a cam profile slot; and
the second actuation arm comprises a post received by the cam profile slot, wherein the cam plate is configured to guide the post via the cam profile slot in response to the optical connection procedure such that the interface moves away from the longitudinal axis.

9. The optical connection system of claim 1, wherein:
the first connector comprises a first diaphragm, a first sealed environment radially inward from the first diaphragm and configured to receive a first portion of optical fluid, and one or more first ports extending through a compensation module radially outward from the first diaphragm, the one or more first ports being configured to enable fluid ingress and egress between an external environment and a first space radially outward from the first diaphragm; and
the second connector comprises a second diaphragm, a second sealed environment radially inward from the second diaphragm and configured to receive a second portion of optical fluid, and one or more second ports extending through a casing radially outward from the second diaphragm, the one or more second ports being configured to enable fluid ingress and egress between the external environment and a second space radially outward from the second diaphragm.

10. A method of connecting a first connector and a second connector of an optical connection system, comprising:
engaging the first connector having at least one first optical element with the second connector having at least one second optical element such that an interface is formed between a first actuation arm of the first connector and a second actuation arm of the second connector;
rotating the first actuation arm about a first pivot point and the second actuation arm about a second pivot point such that the interface moves away from a longitudinal axis extending through the optical connection system; and
coupling the at least one first optical element and the at least one second optical element while the interface is a distance away from the longitudinal axis;
wherein the first connector comprises a male tip disposed at a first distal end of the first actuation arm.

11. The method of claim 10, comprising:
engaging the male tip with a receptacle of a female tip disposed at a second distal end of the second actuation arm of the second connector such that the interface is formed by the male tip and the female tip; and
rotating the female tip about a third pivot point at the second distal end of the second actuation arm such that the female tip maintains engagement with the male tip of the first connector as the interface moves away from the longitudinal axis extending through the optical connection system, wherein the third pivot point is offset from the longitudinal axis before, while, and after the interface moves away from the longitudinal axis.

12. The method of claim 10, comprising:
applying a first spring force to the first actuation arm of the first connector via a first spring and a first actuation sleeve disposed between the first spring and the first actuation arm, wherein the first pivot point is disposed in the first actuation sleeve; and
applying a second spring force to the second actuation arm of the second connector via a second spring and a second actuation sleeve disposed between the second spring and the second actuation arm, wherein the second pivot point is disposed in the second actuation sleeve.

13. The method of claim 12, comprising:
compressing the first spring within a first chamber of the first connector to generate the first spring force as the interface moves away from the longitudinal axis, and such that the first actuation sleeve is retracted within the first chamber; and
compressing the second spring within a second chamber of the second connector to generate the second spring force as the interface moves away from the longitudinal axis, and such that the second actuation sleeve is retracted within the second chamber.

14. The method of claim 11, comprising guiding a post of the second actuation arm via a second cam profile slot defined in a second cam plate as the interface moves away from the longitudinal axis.

15. The method of claim 11, comprising:
filling a first environment of the first connector with a first portion of optical fluid;
sealing the first environment via at least a male tip of the first connector, a first diaphragm of the first connector, and a seal disposed at an end of a compensation module of the first connector;

filling a second environment of the second connector with a second portion of the optical fluid; and sealing the second environment via at least a female tip of the second connector and a second diaphragm of the second connector.

16. An optical connection system, comprising:
a first connector having a first actuation arm rotatable about a first pivot point of the first connector, and having a first plurality of optical elements;
a second connector having a second actuation arm rotatable about a second pivot point of the second connector, and having a second plurality of optical elements; and
at least one spring configured to exert, in response to engagement of the first connector with the second connector and to facilitate a coupling of the first plurality of optical elements with the second plurality of optical elements, at least one spring force that encourages the first actuation arm to rotate about the first pivot point, the second actuation arm to rotate about the second pivot point, and/or an interface between the first actuation arm and the second actuation arm to move away from a longitudinal axis of the optical connection system;
wherein the first connector comprises a male tip coupled to a distal end of the first actuation arm.

17. The optical connection system of claim 16, wherein the second connector comprises a female tip coupled with the second actuation arm at a third pivot point and having a receptacle configured to receive the male tip, wherein the male tip and the female tip are configured to form the interface, wherein the female tip is configured to rotate about the third pivot point in response to the interface moving away from the longitudinal axis, and wherein the third pivot point is offset from the longitudinal axis before, while, and after the interface moves away from the longitudinal axis of the optical connection system.

18. The optical connection system of claim 16, wherein:
the first connector comprises a first actuation sleeve and the first pivot point is disposed at the first actuation sleeve;
the second connector comprises a second actuation sleeve and the second pivot point is disposed at the second actuation sleeve; and
the at least one spring configured to exert the at least one spring force comprises:
a first spring configured to exert a first spring force against the first actuation sleeve; and
a second spring configured to exert a second spring force against the second actuation sleeve.

19. The optical connection system of claim 16, wherein:
the second connector comprises a cam plate defining a cam profile slot; and
the second actuation arm comprises a post received by the cam profile slot, wherein the cam plate is configured to guide the post via the cam profile slot in response to the at least one spring force such that the interface moves away from the longitudinal axis.

20. The optical connection system of claim 16, wherein the first connector comprises:
a diaphragm radially outward from an environment configured to receive an optical fluid;
a compensation module;
a male tip adjacent a first end of the compensation module; and
a seal adjacent a second end of the compensation module, wherein the diaphragm, the male tip, and the seal are configured to seal the optical fluid within the environment.

* * * * *